United States Patent
Cachin et al.

(10) Patent No.: US 8,655,919 B2
(45) Date of Patent: Feb. 18, 2014

(54) STORAGE SYSTEM AND METHOD FOR UPDATING A HASH TREE

(75) Inventors: Christian Cachin, Tahlwil (CH); Paul T. Hurley, Zurich (CH); Jan Kunigk, Boeblingen (DE); Roman A. Pletka, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/171,595

(22) Filed: Jul. 11, 2008

(65) Prior Publication Data

US 2009/0037491 A1 Feb. 5, 2009

(30) Foreign Application Priority Data

Jul. 30, 2007 (EP) .................................. 07113395

(51) Int. Cl.
*G06F 7/00* (2006.01)
*G06F 17/30* (2006.01)

(52) U.S. Cl.
USPC ........................... 707/797; 707/792; 707/793

(58) Field of Classification Search
None
See application file for complete search history.

(56) References Cited

U.S. PATENT DOCUMENTS

| | | | | |
|---|---|---|---|---|
| 5,701,469 A * | 12/1997 | Brandli et al. | ........................ | 1/1 |
| 6,023,706 A * | 2/2000 | Schmuck et al. | ..................... | 1/1 |
| 6,760,721 B1 * | 7/2004 | Chasen et al. | ........................ | 1/1 |
| 6,810,452 B1 * | 10/2004 | James et al. | .................. | 710/104 |
| 2002/0116402 A1 * | 8/2002 | Luke | .............................. | 707/200 |
| 2004/0030731 A1 * | 2/2004 | Iftode et al. | .................... | 707/205 |
| 2004/0267770 A1 * | 12/2004 | Lee | ................................ | 707/100 |
| 2005/0134585 A1 * | 6/2005 | Stall | .............................. | 345/421 |
| 2005/0235154 A1 * | 10/2005 | Serret-Avila | .................. | 713/176 |
| 2006/0026138 A1 * | 2/2006 | Robertson et al. | ................ | 707/3 |
| 2006/0106832 A1 * | 5/2006 | Ben-Dyke et al. | ............ | 707/100 |
| 2006/0288031 A1 * | 12/2006 | Lee | ................................ | 707/101 |
| 2006/0288051 A1 * | 12/2006 | Levand | ........................ | 707/203 |
| 2007/0097138 A1 * | 5/2007 | Sorotokin et al. | ............ | 345/581 |

OTHER PUBLICATIONS

Dan Williams; Optimal Parameter Seletion for Efficient Memory Integrity Verification Using Merkle Hash Trees; 2004; IEEE Computer Society.*

Nam, Beomseok; Distributed Multidimensional Indexing for Scientific Data Analysis Applications; University of Maryland Libaries; Apr. 25, 2007; pp. 72-114.*

Ralph C. Merle, "Protocols for Public Key Cryptosystems", ELXSi International, 1980, IEEE, Sunnyvale, CA, http://www.merkle.com/papers/protocols.pdf, print date Jun. 15, 2011.

* cited by examiner

*Primary Examiner* — Shew-Fen Lin
*Assistant Examiner* — Jermaine Mincey
(74) *Attorney, Agent, or Firm* — Suiter Swantz pc llo

(57) ABSTRACT

A system and method is provided for updating a hash tree in a protected environment. An integrity protection controller is provided for observing one or more system parameters of a storage system and one or more hash tree parameters of the hash trees, and for updating a hash tree in dependence on the storage system parameter and the hash tree parameter.

13 Claims, 6 Drawing Sheets

STORAGE SYSTEM AND METHOD FOR UPDATING A HASH TREE

CROSS-REFERENCE TO RELATED APPLICATIONS

The present application claims the benefit under 35 U.S.C. §119 of EPO Application Serial Number 07113395, filed Jul. 30, 2007, entitled "STORAGE SYSTEM AND METHOD FOR UPDATING A HASH TREE," which is incorporated herein by reference.

TECHNICAL FIELD

The present invention is related to a storage system comprising an integrity protections function for verifying the integrity of data files by means of a hash tree. The invention is further related to a corresponding method and a corresponding computer program

BACKGROUND OF THE INVENTION

Hash trees for verifying the integrity of data blocks of a data file have been described by Ralph C. Merkle in "Protocols for public key cryptography" in Proceedings of the IEEE Symposium on Security and Privacy, pages 122-134, 1980. Such hash trees are also denoted as Merkle hash trees. Hash trees are virtual trees computed over data blocks of the data files to attest to the integrity of the data blocks or of groups of data blocks.

When data blocks are validly changed, the hash tree is no longer current and should be updated. One known method is to perform the update of the hash tree when the data file is finished with, whether through closing or syncing to disc. This has the advantage of not performing any unnecessary hash calculations, but results in a potentially crippling delay and heavy use of the processor of the storage system. Another approach is to perform the update of a hash tree every time a single data block has changed.

It is an object of the invention to provide other solutions for verifying the integrity of data files.

It is a further object of the invention to provide an improved storage system, an improved method and an improved computer program embodying solutions for verifying the integrity of data files.

SUMMARY AND ADVANTAGES OF THE INVENTION

The present invention is directed to a storage system, a method and a computer program as claimed in the independent claims.

Further embodiments of the invention are provided in the appended dependent claims.

According to a first aspect of the present invention, there is presented a storage system, comprising:
 a processing unit☐
 a storage device for storing data files☐
 a storage controller for controlling the storage device☐
 an integrity protection function for verifying the integrity of the data files, the integrity protection function being provided for computing and storing hash trees for the data files☐ and
 an integrity protection controller for controlling the integrity protection function, wherein the integrity protection controller is provided for observing one or more system parameters of the storage system and one or more hash tree parameters of the hash trees and for updating the hash trees in dependence on the storage system parameter and the hash tree parameter.

The storage system according to this aspect of the invention exhibits improved flexibility and efficiency. It controls the integrity protection function by means of the integrity protection controller. The integrity protection function may involve the processing unit, the storage controller and the storage device. It may e.g. be implemented as software application that runs on the storage controller or the processing unit.

The integrity protection controller allows for adapting the updates of the hash function to at least one storage system parameter and at least one hash tree parameter. In other words, the integrity protection controller may adapt the updates of the hash trees to the current state of the storage system and the current state of the hash tree. This allows for choosing proper, better and/or improved ways for the updates. It further improves the overall efficiency of the storage system.

A hash tree parameter may be understood as any parameter that indicates the current status and/or a current feature and/or a current characteristic of the hash tree.

A system parameter may be understood as any parameter that indicates the current status and/or a current feature and/or a current characteristic of the storage system.

According to an embodiment of this aspect of the invention the integrity protection controller is provided for observing as hash tree parameter the frequency of data block updates of the respective data files.

The frequency of data block updates may be defined as the number of data block updates per time period. Preferably, the higher the frequency of block updates, the larger the interval between two hash tree updates is chosen. In other words, the more often a data block of a respective hash tree is updated, i.e., written with new data, the less often an update of the corresponding hash tree should be performed. This embodiment of the invention is advantageous as it avoids unnecessary hash tree updates, i.e. hash tree updates which become obsolete due to prompt further changes of one or more data blocks of the respective data file.

According to a further embodiment of this aspect of the invention the integrity protection function is provided for
 marking the hash value of a leaf node as dirty when the corresponding data block is updated☐ and
 marking all nodes on the path between the dirty leaf node and the root node as dirty, and wherein the integrity protection controller is provided for observing as hash tree parameter the number of dirty nodes of a hash tree relative to the total number of nodes of the respective hash tree.

This embodiment of the invention allows for the detection of hash trees whose fraction of dirty nodes exceeds a predefined threshold. Preferably the higher the percentage of dirty nodes, the higher the priority of the respective hash tree for an update is set by the integrity protection controller.

According to a further embodiment of this aspect of the invention the integrity protection controller is provided for observing as hash tree parameter the distribution of dirty nodes in the hash trees in order to detect clusters of dirty nodes.

This embodiment of the invention allows for the detection of clusters of dirty nodes. In other words, it allows for the detection of hash tree areas in which the density of dirty nodes is higher than in other areas. Preferably, the more clustered the dirty nodes and the less equally distributed the dirty nodes are, the quicker a hash tree update may be performed and the higher the priority of the respective hash tree for an update is set by the integrity protection controller.

This may be illustrated by means of the following example. A contiguous region of two or more leaf nodes is defined as a chunk. Furthermore, a chunk of n dirty nodes is defined as a beacon if it justifies an update of the sub-tree that is spanned by the dirty nodes. A beacon that spans n nodes is then called an n-beacon. A first hash tree with 50 leaf nodes has a chunk of 25 dirty leaf nodes at the left side and a chunk of 25 clean leaf nodes on the right side. A second hash tree of 50 leaf nodes has 25 dirty leaf nodes with no chunks, meaning that dirty and clean nodes alternate. The first hash tree can be recomputed twice as quickly as the second one since only the left sub-tree needs updating. The size of n has a fixed dependency on k, the number of the children of a non-leaf node. If the frequency of dirtying leaf nodes increases, the standard for a chunk to become a beacon region could be lowered by decreasing n.

According to a further embodiment of this aspect of the invention the integrity protection controller is provided for observing as storage system parameter the processor load of the processing unit.

The updating of one or more hash trees may utilize significant processing power of the processing unit. According to this embodiment of the invention the integrity protection controller takes into account the current processor load of the processing unit, i.e. the load given by other applications that the processing unit has to perform.

Preferably, the higher the processor load, the lower the priority of the respective hash tree for an update is set by the integrity protection controller.

According to a further embodiment of this aspect of the invention the integrity protection controller is provided for receiving feedback about the performed hash tree updates from the integrity protection function.

Such feedback may comprise information about redundant, unnecessary or sub-optimal updates and may be used to improve the further update strategy. Such feedback may be used to employ a self-learning system.

According to a further embodiment of this aspect of the invention the integrity protection controller is provided for performing a partial or a total update of the hash trees in dependence on at least one hash tree parameter.

A partial tree update is in particular useful if the hash tree comprises clusters of dirty nodes. This saves processing power compared with a total hash tree update. This embodiment of the invention is in particular useful for storage systems in which the integrity protection controller observes as hash tree parameter the distribution of dirty nodes.

According to a further embodiment of this aspect of the invention the integrity protection controller is implemented as a linear open loop controller.

Such a controller can be implemented in an efficient and cost saving way.

According to a further embodiment of this aspect of the invention a hash tree updating interval is maintained as control parameter that determines the time between two hash tree updates.

Such a controller can be implemented in an efficient and cost saving way.

According to a further embodiment of this aspect of the invention the length of the hash tree updating interval is regularly adapted in dependence on at least one system parameter and at least one hash tree parameter.

This further improves the efficiency of the hash tree updates. As an example, the higher the processor load, the longer the hash tree updating interval should be set. As another example, the higher the frequency of block updates of a respective data file, the longer the hash tree updating intervals should be set.

According to a further embodiment of this aspect of the invention the integrity protection controller is provided with a look-up table comprising two or more predefined updating intervals for the hash tree updates, wherein the predefined updating intervals are determined by at least one system parameter and at least one hash tree parameter.

Such a look-up table can be implemented in an efficient and cost saving way. This embodiment of the invention provides the further advantage that the behavior of the integrity protection controller may be defined in advance in a precise way.

According to a second aspect of the invention there is presented a method for adaptively updating hash trees of a storage system, wherein the method comprises:
- a computing step for computing a hash tree of a data file☐
- a storing step for storing the hash tree in the storage system☐
- an observation step for observing one or more system parameters of the storage system and one or more hash tree parameters of the hash trees☐ and
- an updating step for triggering an hash tree update in dependence on the storage system parameter and the hash tree parameter.

According to a third aspect of the invention there is presented a computer program comprising instructions for carrying out the steps of the method according to the second aspect of the invention.

Any disclosed embodiment may be combined with one or several of the other embodiments shown and/or described. This is also possible for one or more features of the embodiments.

Any feature of one aspect of the invention may be applied to another aspect of the invention and vice versa.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale. FIG. 1 shows a schematic illustration of a storage system 100 according to an embodiment of the invention. The storage system 100 comprises a processing unit 110, a storage device 120 and a storage controller 130. The storage device 120 is provided for storing data files 121. The data of the data files 121 is preferably stored block by block in data blocks 122. Hence one data file 121 may comprise one or more data blocks 122. The data files 121 are stored in a data file section 123 of the storage device 120. The storage controller 130 is provided for controlling the storage device 120. This includes the control of read operations of data files 121 from the data file section 123 of the storage device 120. It further includes the control of write operations of data files 121 to the data file section 123 of the storage device 120.

Figure 1:
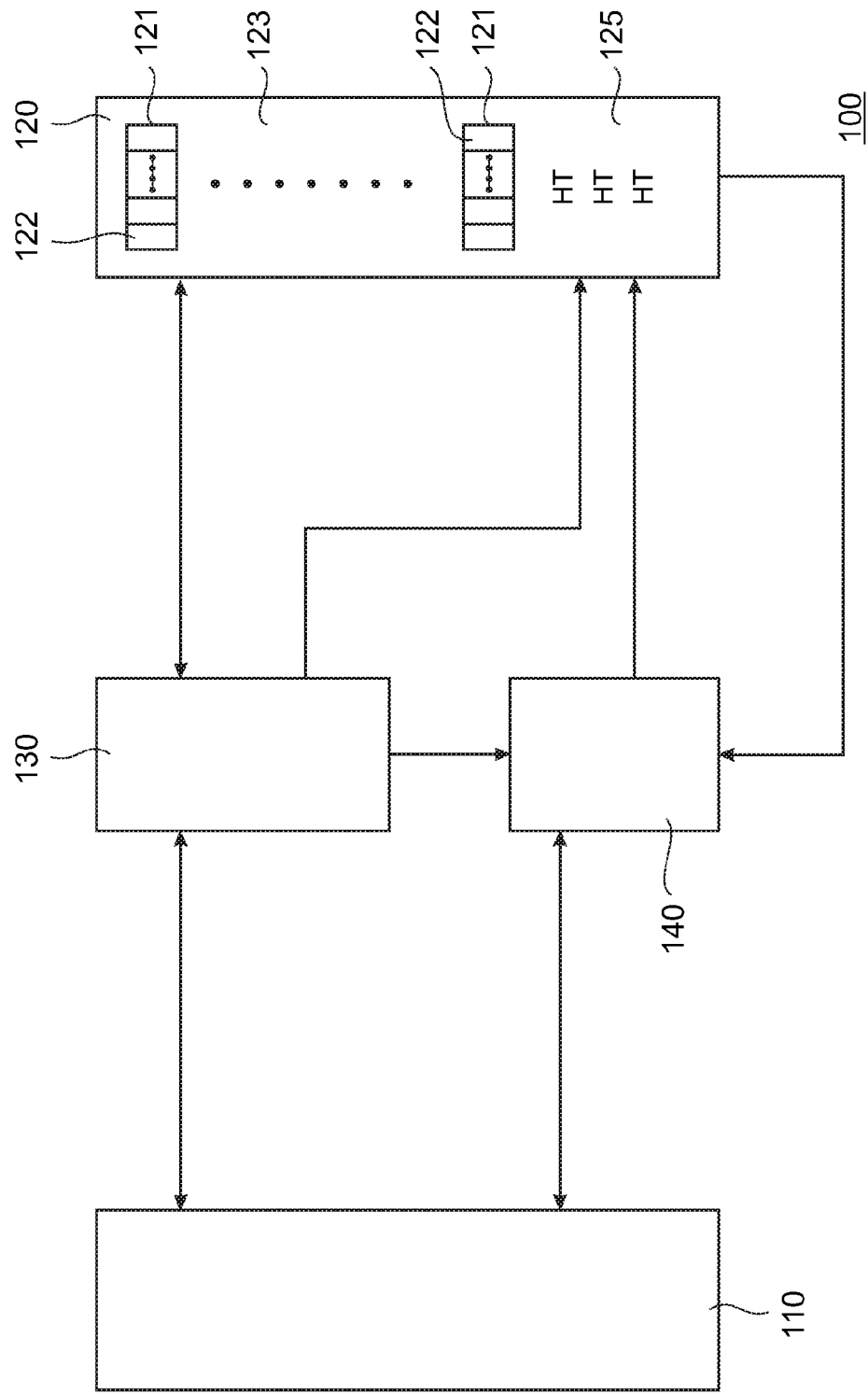
FIG. 1 shows a schematic illustration of a block diagram of a storage system according to an embodiment of the invention.

The storage system 100 comprises an integrity protection function for verifying the integrity of the data files 121. The integrity protection function is provided for computing and storing hash trees HT for the data files 121. The storage device 120 comprises a hash tree section 125 for storing the hash trees HT.

The storage system 100 comprises an integrity protection controller 140 for controlling the integrity protection function. The integrity protection controller 140 is provided for observing one or more system parameters of the storage system 100 and one or more hash tree parameters of the hash trees HT that are stored in the hash tree section 125. The integrity protection controller 140 is further provided for updating the hash trees HT in dependence on one or more storage system parameters and one or more hash tree parameters.

In operation, the integrity protection controller 140 receives system parameters relating to the system activity of the storage system 100 from the processing unit 110 and/or from the storage controller 130. Such a system parameter may be e.g. the actual processing load of the processing unit 110. In addition, the integrity protection controller 140 receives hash tree parameters from the storage controller 130 and/or from the processing unit 110. The integrity protection controller 140 is furthermore provided for receiving feedback about the performed hash tree updates from the integrity protection function.

The integrity protection function may be implemented in hardware and/or software. As an example, the integrity protection function could be implemented as a software program running on the storage system 100. The integrity protection function may use the central processing unit 110, the storage controller 130 and the hash tree section 125 of the storage device 120 for its operation.

Figure 2:
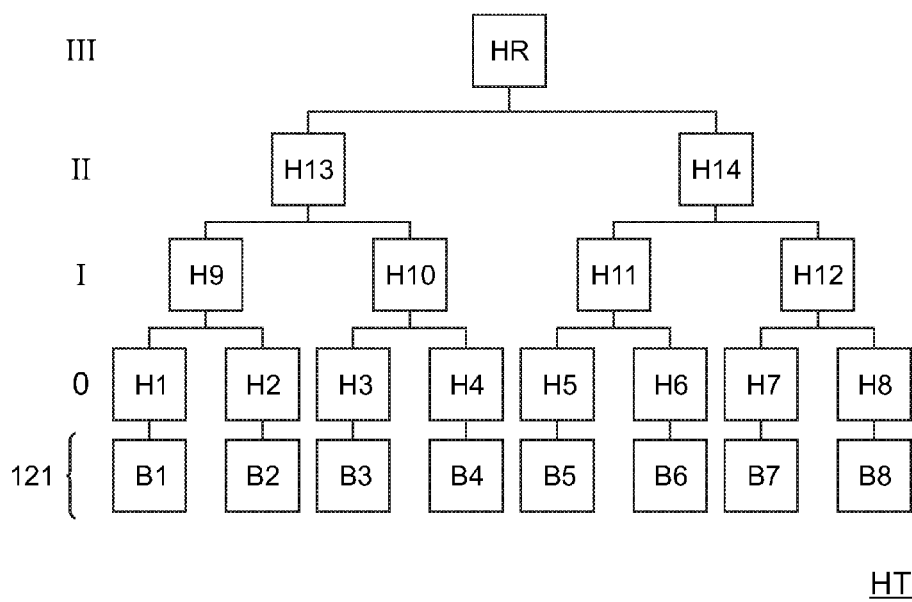
FIG. 2 shows a schematic illustration of a hash tree.

FIG. 2 shows a schematic illustration of a hash tree HT. Such a hash tree HT is computed by the integrity protection function of the storage system 100 and stored in the hash tree section 125 for each data file 121 that is written to the data file section 123 of the storage device 120. The hash tree HT is a data structure that is used to verify the integrity of the data files 121. The hash tree HT is a binary hash tree and computed for a data file 121 which comprises 8 data blocks B1, B2, ... B8. For each data block B1, B2, ... B8 there is computed a corresponding hash value H1, H2, ... H8 by applying a cryptographically secure hash function h on the respective data block. Such hash functions h generate a fixed-length output from an input string of variable length, such that the output can serve as a representation of the input. Such hash functions are collision-free, which means that it is computationally infeasible to find any two messages x and x' such that x≠x' but h(x)=h(x'). A cryptographically secure hash function is also a one-way function. Examples of suitable hash functions are MD5, SHA-1, SHA-256, SHA-384, and SHA-512.

The hash values H1, H2, ... H8 are also denoted as the leaves of the hash tree HT. In this example the hash values H1, H2, ... H8 establish a level 0 of the hash tree HT. A level I comprises hash values H9, H10, H11 and H12. The hash value H9 forms the parent node for the hash values H1 and H2 and is computed by H9=h (H1∥H2), wherein the symbol ∥ denotes concatenation. The hash value H10 forms the parent node for the hash values H3 and H4 and is computed by H10=h (H3∥H4). The hash value H11 forms the parent node for the hash values H5 and H6 and is computed by H11=h (H5∥H5). The hash value H12 forms the parent node for the hash values H7 and H7 and is computed by H12=h (H7∥H7). A level II comprises hash values H13 and H14. The hash value H13 forms the parent node for the hash values H9 and H10 and is computed by H13=h (H9∥H10). The hash value H14 forms the parent node for the hash values H11 and H12 and is computed by H14=h (H11∥H12). Finally, a level III comprises a root hash value HR. The root hash value HR forms the parent node for the hash values H13 and H14 and is computed by HR=h (H13∥H14).

In general, a hash tree of degree k is based on a cryptographically secure hash function h: $\{0,1\}^* \rightarrow \{0,1\}^d$ that maps arbitrary-length input bit strings to d-bit output strings. A k-ary hash tree is a tree in which every node has at most k children. In a k-ary hash tree, the nodes store hash values H determined as follows: every leaf node stores the output of the hash function h applied to a data block B of length b bytes of the data file. Every internal node stores the hash value H computed on the concatenation of the hash values H in its children. In other words, if an internal node u has children u1, ... uk storing hash values Hu1, ..., Huk, then Hu is set to h(Hu1∥ ... ∥Huk), where ∥ again denotes the concatenation of bit strings. It is supposed that the hash tree has depth t. The levels of a hash tree are numbered according to their height: The root node has height t, and every other node has height x−1 if its parent has height x. Hence, leaves have height 0 and are at level 0. One property of a hash tree is that, unless one succeeds in finding a collision in h, it is impossible to change any value in the tree (in particular, a value stored in a leaf node) without also changing the root value. In this sense, the root value of the tree implicitly "defines" the file through the blocks associated with the leaf nodes. Moreover verification and modification can proceed incrementally: to verify a data block B, compute h(B) and then recompute the root value of the tree as follows: for every node along the path from the node corresponding to h(B) to the root, recompute its hash value from the previously computed hash value in the node at the lower level and from the hash values its k−1 siblings. If the recomputed hash value at the root of the tree matches the stored hash value, the block is verified. The same algorithm may be used for updating the hash value of the tree when a block B has been modified. Verification and update operations therefore take O(log k(n/b)) hash function calculations instead of O(n/b).

Figure 3:
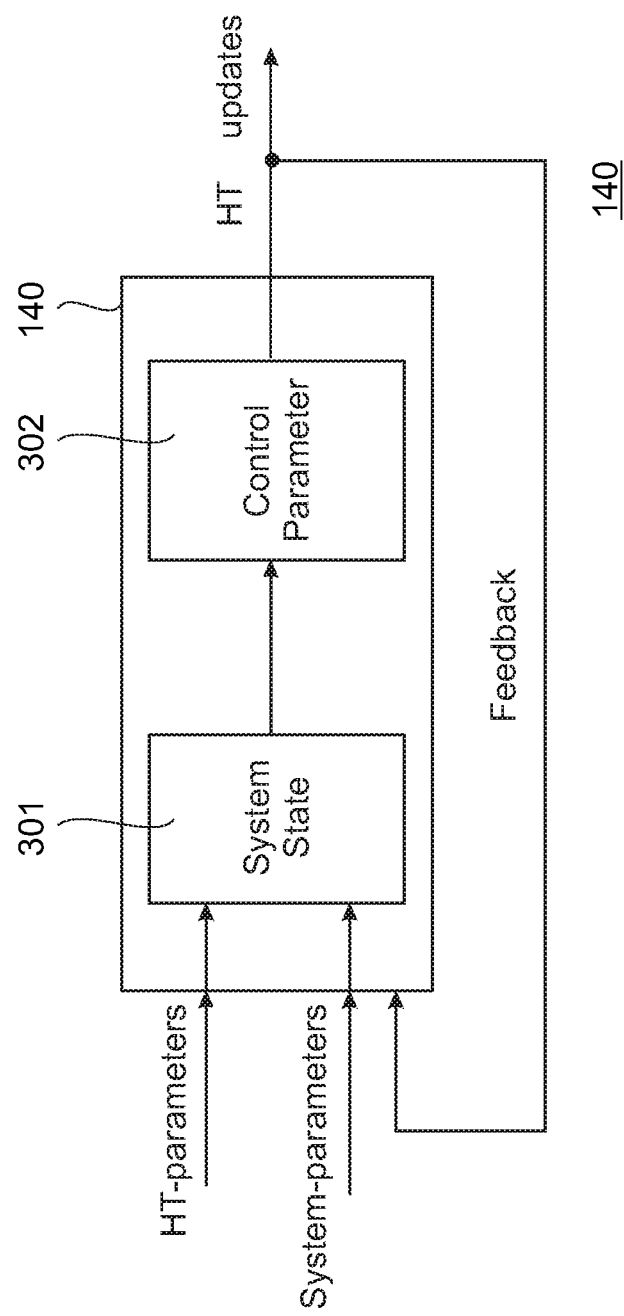
FIG. 3 shows a schematic illustration of the function of an integrity protection controller according to an embodiment of the invention.

FIG. 3 illustrates the function of the integrity protection controller 140 according to an embodiment of the invention in more detail. The integrity protection controller 140 receives hash tree parameters and system parameters as input parameters from the central processing unit 110 and the storage controller 130 respectively. These input parameters are processed by a system state component 301 of the integrity protection controller 140. The system state component 301 maintains variables that represent the state of the storage system 100 and of the hash trees stored in the hash tree section 125 of the storage device 120. In other words, the system state component 301 keeps track of the current state of the storage system 100 and of the current state of the hash trees stored in the hash tree section 125. The system state component 301 comprises rules for updating control parameters of a control parameter unit 302. If, according to the rules, an updating of one or more control parameters is indicated, the system state component 301 sends a corresponding update signal to the control parameter component 302. The control parameter unit 302 updates its control parameters and performs an update of the hash trees according to these updated control parameters.

Optionally feedback about the hash tree updates may be provided as additional input to the integrity protection controller 140.

The integrity protection controller 140 may be a linear open loop controller. According to one embodiment the integrity protection controller 140 maintains a hash tree updating interval int as control parameter. In other words, the hash trees are updated regularly, wherein the time between the updates is determined by the updating interval int. The length of the updating interval int serves as control parameter and is adapted in dependence on one or more storage system parameters and one or more hash three parameters.

As an example, the updating interval int could be controlled in the following way:

$$int\text{new} = int\text{old} + \alpha 1 \cdot (s\text{curr} - s\text{old}) + \alpha 2 \cdot (e\text{curr} - e\text{old})$$

The symbols are denoted as follows:
intnew: length of the new updating interval
intold: length of the old updating interval
$\alpha 1, \alpha 2$: weighing factors
scurr: current system activity, e.g. current load of the processing unit
sold: old (former) system activity, e.g. old load of the processing unit
ecurr: current frequency of data block updates (update events)
eold: old (former) frequency of data block updates (update events)

According to this example, the new updating interval intnew is adapted linearly to the current system activity of the storage system, e.g. to the load of the processing unit, and to frequency of block update events. If the load of the processing unit increases, the length of the new interval intnew is increased as well, i.e., the hash tree updates are performed less regularly. Furthermore, if the current frequency of data block update events increases, the length of the new interval intnew is increased as well.

By means of the dependency of intnew on the load of the processing unit it is controlled that hash tree updates preferably take place when the processing load is low.

By means of the dependency of intnew on the frequency of data block updates it is controlled that the hash tree updates preferably take place when there is low block update activity in the respective hash tree or in the respective part of the hash tree, thereby avoiding unnecessary hash tree updates.

Preferably the control parameter unit performs an update of the control parameters only after a predefined number of updating intervals int, thereby performing an averaging of the changes of the storage system parameters and the hash tree parameters. This has a filter effect and avoids an overreaction to single or short term events.

Figure 4:
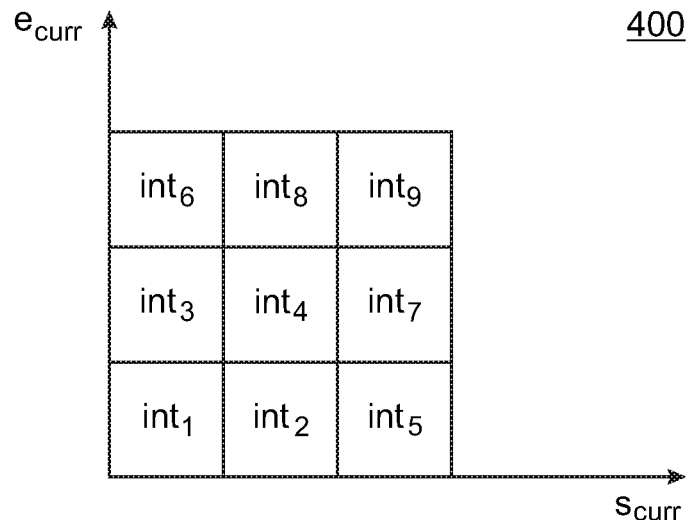
FIG. 4 shows a look-up table of an integrity protection controller.

According to another embodiment of the invention the integrity protection controller 140 is provided with a look-up table. An example of a look-up table 400 is illustrated in FIG. 4. The look-up table 400 comprises nine predefined updating intervals int1, int2, . . . int9 for the hash tree updates. The integrity controller 140 is provided for selecting one of the nine updating intervals int1, int2, . . . , int9 in dependence on at least one system parameter and at least one hash tree parameter. The look-up table 400 comprises on the x-axis a dependency on the current processing load scurr of the processing unit 110. The look-up table 400 comprises on the y-axis a dependency on the current frequency of block updates ecurr. The integrity controller 140 determines the current processing load scurr and the current frequency of block updates ecurr and selects the time interval inti that corresponds to the respective pair (scurr, ecurr) in the look-up table 400.

Figure 5:
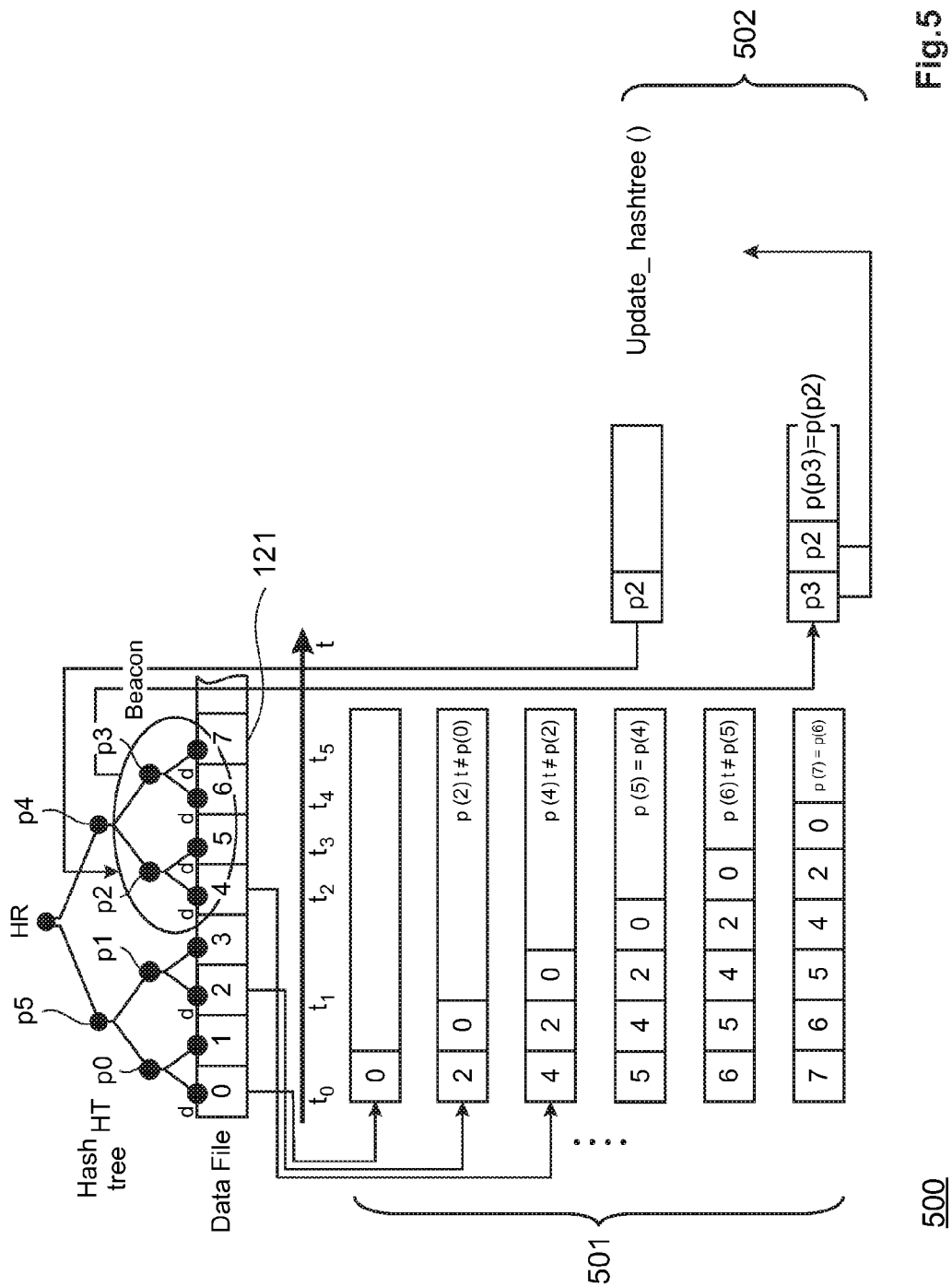
FIG. 5 shows cluster detector for detecting clusters of dirty nodes in a hash tree.

FIG. 5 illustrates a cluster detector 500 for detecting clusters of dirty nodes in a hash tree.

The cluster detector 500 is preferably implemented in the integrity protection controller 140. The cluster detector 500 comprises a first register 501 which enqueues a reference to a data block whenever a data block is updated. In the exemplary embodiment of FIG. 5 a data file 121 comprises 8 data blocks referenced by the numbers 0 to 7 and a corresponding hash tree HT. It is assumed that the data blocks of the data file 121 are updated, i.e. written with new data, according to the following sequence: 0-2-4-5-6-7. In other words, at first the data block 0 is updated, then the data block 2 and so forth. Provided the queue in the shift register 501 is non-empty, the reference to an updated data block that is newly written in the shift register 501 is compared to the previous reference in the shift register 501. If the newly written data block and the previous data block have the same parent node, they are siblings and a contiguous region of dirty nodes has been detected. Then the parent node of the contiguous region of dirty nodes is added to a second shift register 502 which is used to establish a second queue. The aforementioned procedure is then repeated for this second queue upon arrival of a new parent node of another contiguous region of dirty nodes. In other words, in the second shift register 502 it is evaluated whether the previously stored parent node of a contiguous region of dirty nodes and the newly stored parent node of a contiguous region of dirty nodes have the same parent or, in other words, whether the corresponding data blocks have the same grandparent. In the embodiment illustrated in FIG. 5 the data blocks 4 and 5 have the same parent node p2 and accordingly a reference to p2 is written in the second shift register 502. Furthermore, the data blocks 6 and 7 have the same parent p3 and subsequently a reference to p3 is written in the second shift register 502. Upon arrival of p3 in the second shift register 502 it is evaluated whether the parent nodes p2 and p3 have the same parent. As they have the same parent p4, a hash tree update signal is generated and the integrity protection controller 140 may trigger an update of the corresponding hash tree HT. The cluster detector 500 allows for observing the distribution of dirty nodes in the hash tree HT. This allows for partially updating the hash tree HT. In this example only the right part of the hash tree could be updated as it is dirtier than the left part of the hash tree.

According to another embodiment the above described procedure could be repeated for grandparents or great grandparents etc. According to another embodiment the detection of a cluster of dirty nodes could be deemed a trigger for an update at a later point or it could be used as an input for further update conditions. The determination of a later update point could be made dependant on the degree and depth of the hash tree or could be user-defined.

In summary, the cluster detector 500 detects clusters or contiguous regions of dirty nodes in a hash tree by comparison of the parents of leaf nodes as they are made dirty.

The integrity protection controller 140 may further comprise a frequency detector for detecting the frequency of data block updates. One embodiment to implement such a frequency detector is to count the number of data blocks in the queue at fixed intervals. If more data blocks are encountered at the next count, an increase in the frequency is detected. To avoid over-reacting to transitory increases, a low-pass filter can be used.

To determine if a given node is updated and thereby invalidated repeatedly, one can measure how many times it is in the queue.

According to one embodiment a counter for every node or a subset of nodes could be provided. According to another embodiment a counting bloom filter could be used to keep track of nodes that are updated, also referred to as incoming nodes. A bloom filter uses a number of hash functions which map to a given number to specific parts of a bitmap. For different numbers, this results in different mapping patterns. A counting bloom filter keeps a count of how many times it has hashed to a specific location in the map. This map indicates the number of occurrences with some loss of information, but is a lot smaller and easier to process.

Figure 6:
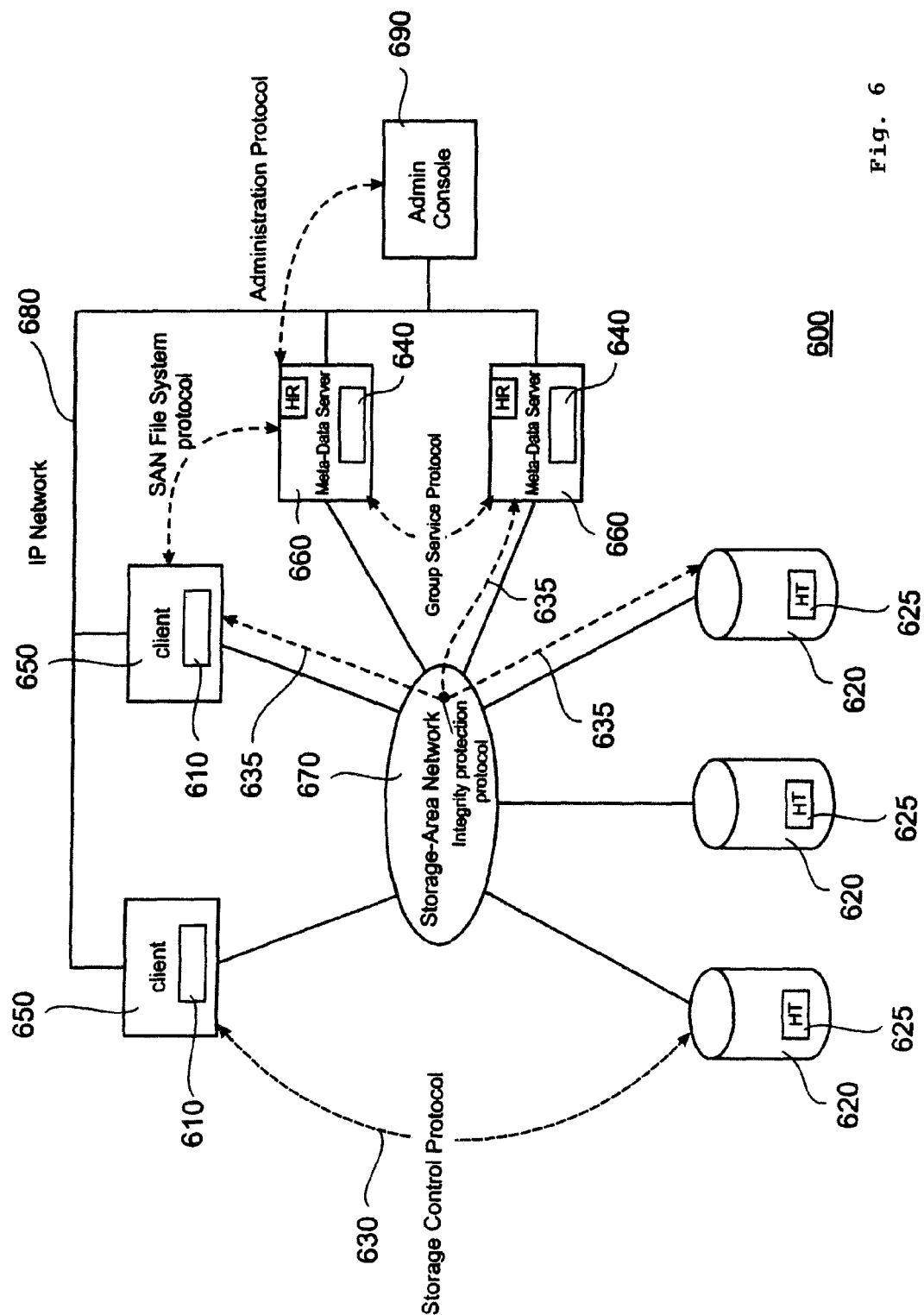
FIG. 6 shows a schematic illustration of a block diagram of another storage system according to an embodiment of the invention.

FIG. 6 illustrates a storage system 600 according to another embodiment of the invention. The storage system 600 is a storage area network file system. It comprises storage devices 620, clients 650 and meta data servers 660. The clients 650 are provided for reading and writing data to the storage devices 620. The meta data servers 660 manage all meta data of the storage system 600. Furthermore, the storage system 600 comprises a storage area network (SAN) 670 to connect the clients 650, the meta-data servers 660 and the storage devices 620. The storage system 600 comprises an Internet Protocol (IP)-based network 680. In addition, the storage system 600 comprises an administration console 690 for controlling the meta-data servers 660.

The storage system 600 may support heterogeneous clients, so that data on the storage devices 620 can be accessed from a Windows client or a Linux client. The clients 650 communicate with the meta-data servers 660 over the IP-based network 680, whereas for access to the storage devices 620 the dedicated storage area network 670 is used. Alternatively it is possible to use a single IP-based network such as Ethernet.

The various entities described above communicate with each other using several different protocols:

The clients 650 communicate with the meta-data servers 660 using a SAN Filesystem protocol. This protocol runs on the IP-network 680 and can e.g. use the User Datagram Protocol (UDP) or the Transmission Control Protocol (TCP) as the underlying transport protocol. The clients 650 access the storage devices 620 using a storage control protocol 630, also denoted as data-access protocol which may run e.g. over an internet Small Computer Interface (iSCSI), over SCSI over Fibre Channel, or over SCSI over a parallel bus. The storage control protocol 630 establishes a software implementation of a storage controller. The nodes in the cluster of the meta-data servers 660 run a cluster group service protocol to form a homogeneous view of the cluster, as individual nodes leave the cluster upon failure and rejoin when they recover. This cluster group service protocol also allows the cluster to be managed as a single virtual entity. An administration protocol is used by the administration console 690 to communicate with nodes in the cluster of meta-data servers 660 for configuration and administration purposes. The clients 650 comprise processing units 610. To protect the integrity of data in flight and data at rest, an integrity protection function is provided for computing and storing hash trees HT for the data files 121. The hash tree HT can be computed by the processing units 610 of the clients 650 when writing a data file and verified by the clients 650 when reading a data file. The integrity protection function is established by means of an integrity protection protocol 635 that runs on the clients 650, the meta-data servers 660, the storage area network 670 and the storage devices 620. Preferably only the root hash HR is stored in the meta-data servers 660, while the other nodes of the hash trees HT are stored in hash tree sections 625 of the storage devices 620. The meta-data servers 660 comprise an integrity protection controller 640 for controlling the integrity protection function. The integrity protection controller 640 is provided for observing one or more system parameters of the storage system 600 and one or more hash tree parameters of the hash trees HT that are stored in the hash tree sections 625. The integrity protection controller 640 is further provided for updating the hash trees HT in dependence on one or more storage system parameter and one or more hash tree parameters. The integrity protection controller 640 receives system parameters relating to the system activity of the storage system 600 from the processing units 610 and/or from the storage control protocol 630. Such a system parameter may be e.g. the actual processing load of the processing units 610. Furthermore, the integrity protection controller 640 receives hash tree parameters relating to the state of the hash trees HT from the integrity protection protocol 635.

Figure 7:
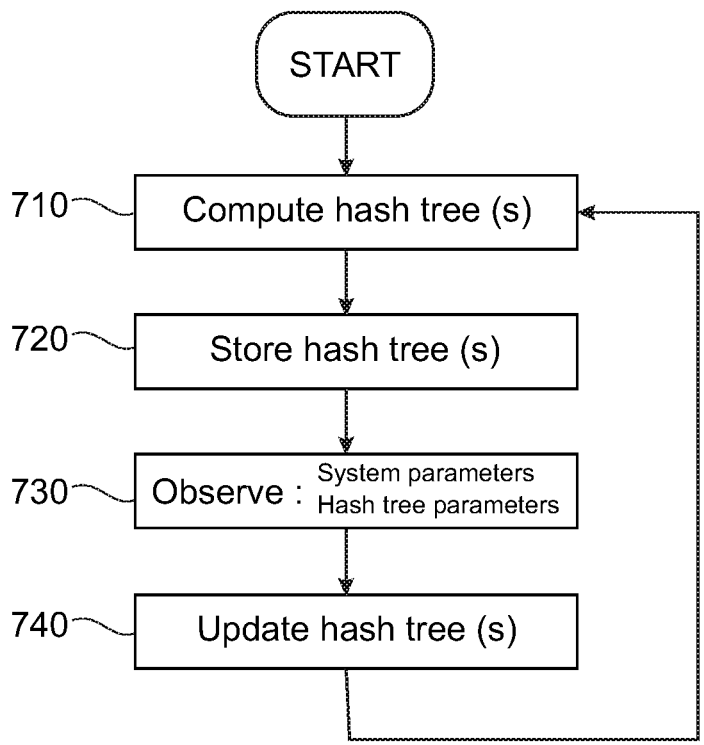
FIG. 7 shows a flow chart of a method for adaptively updating hash trees of a storage system.

FIG. 7 shows a flow chart of a method for adaptively updating hash trees of a storage system.

The method comprises a computing step 710 for computing a hash tree of a data file. In a subsequent storing step 720 the computed hash tree is stored, e.g. in the hash tree section 125 of the storage device 120 of FIG. 1. In an observation step 730 one or more system parameters of the storage system 100 and one or more hash tree parameters of the hash trees HT are observed. This observation step 730 may be e.g. performed by the integrity protection controller 140 of FIG. 1. In an updating step 740 an update signal is generated which triggers an update of one or more hash trees HT in dependence on at least one storage system parameter and at least one hash tree parameter. The method continues then with the computing step 710 in which one or more new hash trees HT or new parts of one or more hash trees HT are computed. The new hash trees HT or new parts of hash trees HT are then stored in the storing step 720. As a result, one or more hash trees HT have been totally or partially updated.

Exemplary embodiments of the invention have been described above purely by way of example and modifications of detail can be made within the scope of the invention.

Any disclosed embodiment may be combined with one or several of the other embodiments shown and/or described. This is also possible for one or more features of the embodiments.

ADDITIONAL EMBODIMENT DETAILS

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A storage system, comprising:
   a processing unit;
   a storage device for storing data files;
   a storage controller for controlling the storage device;
   an integrity protection controller for providing integrity protection for a data file utilizing a hash tree computed based on said data file, the hash tree includes a plurality of hash values corresponding to a plurality of data blocks of said data file;
   wherein:
      the integrity protection controller is provided with a look-up table;
      the look-up table comprises predefined updating intervals;
      the look-up table comprises a x-axis dependency on a current processing load and a y-axis dependency on a current frequency of block updates;
      the integrity protection controller is provided with a cluster detector;
      the cluster detector comprises a first shift register and a second shift register which enqueues references to updated data;
   wherein the integrity protection controller is configured for:
      determining an updating for the hash tree based on one of:
         update intervals in the look-table corresponding to the current processing load and the current frequency of the block updates determined by the integrity controller; and
         a comparison of the first newly written data in the shift registers to the first previously written data in the shift register performed by the cluster detector;
      adding the a parent node to a second shift register in response to determining the first newly written data and the first previously written data have the same first parent node;
      comparing second newly written data in the shift registers to second previously written data in the shift register with the cluster detector;
      adding a second parent node to a second shift register in response to determining the second newly written data and the second previously written data have the same second parent node;
      triggering an update in response to determining the first parent data in the second shift register and the second parent data in the second shift register have the same parent node; and
      in response to an update:
         marking the hash value of a leaf node as dirty when the corresponding data block is updated;
         marking all nodes on a path between the dirty leaf node and a root node as dirty;
         determining the updating frequency for the hash tree based on the number of dirty nodes of the hash tree relative to a total number of nodes of the hash tree; and
         receiving feedback about updates to said hash tree, said feedback comprising information indicating said updates are at least one of redundant, unnecessary or sub-optimal.

2. The storage system according to claim 1, wherein the updating frequency for the hash tree is determined based on the frequency of data block updates of the data file.

3. The storage system according to claim 1, wherein the updating frequency for the hash tree is determined based on the distribution of dirty nodes in the hash tree.

4. The storage system according to claim 1, wherein the updating frequency for the hash tree is determined based on the load of the processing unit.

5. The storage system according to claim 1, wherein the integrity protection controller is configured for performing a partial or a total update of the hash tree based on at least one of:
   the frequency of updates of the data file;
   the number of dirty nodes in the hash tree; and
   the distribution of dirty nodes in the hash tree.

6. The storage system according to claim 1, wherein the integrity protection controller is implemented as a linear open loop controller.

7. The storage system according to a claim 1, wherein the updating frequency for the hash tree is controlled utilizing a hash tree updating interval, the hash tree updating interval is maintained as control parameter that determines the time between two hash tree updates.

8. The storage system according to claim 7, wherein the length of the hash tree updating interval is regularly adapted based on at least one of:
   the frequency of updates of the data file;
   the number of dirty nodes in the hash tree;
   the distribution of dirty nodes in the hash tree; and
   the load of the processing unit.

9. The storage system according to claim 1, wherein the integrity protection controller is provided with a look-up table comprising two or more predefined updating intervals for the hash tree updates, wherein the predefined updating intervals are determined based on at least one of:
   the frequency of updates of the data file;
   the number of dirty nodes in the hash tree;
   the distribution of dirty nodes in the hash tree; and
   the load of the processing unit.

10. The system according to claim 1, wherein the updating frequency for the hash tree is decreased when the frequency of updates of the data file increases.

11. The storage system according to claim 1, wherein the updating frequency for the hash tree is increased when the frequency of updates of the data file decreases.

12. The storage system according to claim 1, wherein the updating frequency for the hash tree is decreased when the load of the processing unit increases.

13. The storage system according to claim 1, wherein the updating frequency for the hash tree is increased when the load of the processing unit decreases.

* * * * *